United States Patent [19]
McKenzie

[11] 3,906,397
[45] Sept. 16, 1975

[54] DIATOMIC INFRARED GASDYNAMIC LASER

[75] Inventor: Robert L. McKenzie, Sunnyvale, Calif.

[73] Assignee: The United States of America as represented by the United States National Aeronautics and Space Administration, Washington, D.C.

[22] Filed: Apr. 26, 1971

[21] Appl. No.: 137,391

[52] U.S. Cl. ...................... 331/94.5 G; 331/94.5 P
[51] Int. Cl.² .......................................... H01S 3/00
[58] Field of Search .................................. 331/94.5

[56] References Cited
UNITED STATES PATENTS
3,560,876  2/1971  Airey ................................. 331/94.5
3,571,747  3/1971  Bronfin et al. .................... 331/94.5

OTHER PUBLICATIONS

Hurle et al., "Electronic Population Inversions by Fluid-Mechanical Techniques," Physics of Fluids, Vol. 8, pp. 1601–1607, Sept. 1965.
Kuehn et al., "Experiment with a $CO_2$ Gas–Dynamic Laser," Applied Physics Letters, Vol. 16, pp. 48–50, Jan. 1, 1970.
Patel, "Recent Developments in $CO_2$ and other Molecular Lasers," J. Chim. Phys., Vol. 64, pp. 82–92, Jan. 1967.
Gerry, "Gasdynamic Lasers," IEEE Spectrum, Vol. 7, pp. 51–58, Nov. 1970.
Osgood et al., "An Investigation of the High–Power CO Laser," IEEE Jour. of Quantum Electronics, QE–6, pp. 145–154, March 1970.
Barchewitz et al., "Emission Infrarouge de CO et $CO_2$ et laser continu a $CO_2$ par action directe d'une excitation haute frequence," Comp. Rend., t. 260, pp. 3581–3582, Mar. 29, 1965.
Konyukhov et al., "Vibrational Relaxation of $CO_2$ and $N_2$ Molecules in an Expanding Supersonic Gas Jet," JETP Letters, Vol. 10, pp. 53–55, July 20, 1969.

Primary Examiner—Edward S. Bauer
Attorney, Agent, or Firm—Darrell G. Brekke; Armand G. Morin, Sr.; John R. Manning

[57] ABSTRACT

A gasdynamic laser is provided utilizing the infrared vibration-rotation transitions of a diatomic gas such as carbon monoxide.

8 Claims, 5 Drawing Figures

ROBERT L. McKENZIE
INVENTOR.

BY Armand G. Morris
ATTORNEY

ROBERT L. McKENZIE
INVENTOR.

DIATOMIC INFRARED GASDYNAMIC LASER

The invention described herein was made by an employee of the United States Government and may be manufactured and used by or for the Government for Governmental purposes without the payment of any royalties thereon or therefor.

BACKGROUND OF THE INVENTION

1. Field of the Invention
Gasdynamic laser.

2. Description of the Prior Art

Previous gasdynamic lasers have relied on population inversions created among the lower vibrational levels of a polyatomic gas, such as carbon dioxide. Since such lasers utilize lower vibrational levels, they operate principally with a narrow wavelength band centered near 10.6 $\mu$m. They also require a large optical resonator dimension in the flow direction to extract all of the latent power available. The large dimension is necessary because the population of that level must be given time (while passing through the optical resonator) to be restored by collisional exchange of vibrational energy with other pumping molecules such as nitrogen. These other gases are present in mixture with the active gas.

SUMMARY OF THE INVENTION

For the purposes of the present invention a gasdynamic laser is defined as a gas laser wherein the necessary conditions for lasing are created solely by a thermal expansion of the laser media to supersonic flow speeds. The diatomic gasdynamic laser of the present invention which uses an infrared active diatomic gas such as carbon monoxide lases from numerous high-lying vibrational energy levels. Laser wavelengths depend on the particular vibration-rotation transition in use and, for example when using CO, have been obtained throughout the band between 4.78 and 5.4 $\mu$m. Furthermore, the removal of laser power from one vibrational transition, enhances the ability of the adjacent levels to lase. When operated with multiple transverse modes, the laser media is therefore able to give energy as laser power in a distance characterized by the time required for several radiative transitions; a time which is several orders of magnitude shorter than the collisional pumping times limiting the power of previous polyatomic gasdynamic lasers of the same optical cavity dimensions. The optical resonator size in the flow direction, required to extract an equal fraction of latent power, is therefore less in the diatomic gasdynamic lasers of the present invention.

Although diatomic gases such as CO have been used in lasers in the past, in such lasers an electric discharge or chemical reaction is required to create the necessary conditions for lasing. Such lasers are not gasdynamic lasers and their principles of operation are significantly different. The maximum laser power potentially available in other than gasdynamic lasers is limited by more restricted constraints than those for gasdynamic lasers.

Thus, the diatomic gasdynamic lasers of the present invention can provide laser operation on numberous separate vibrational transitions with significantly different wavelengths, all from the same device. This feature is made possible by installing several optical resonators at different locations in a single device. Such a method of operation is also possible in polyatomic gasdynamic lasers with greater difficulty and, provides at best a selection of wavelengths from only two vibrational transitions.

DESCRIPTION OF THE PREFERRED EMBODIMENTS

Figure 1:
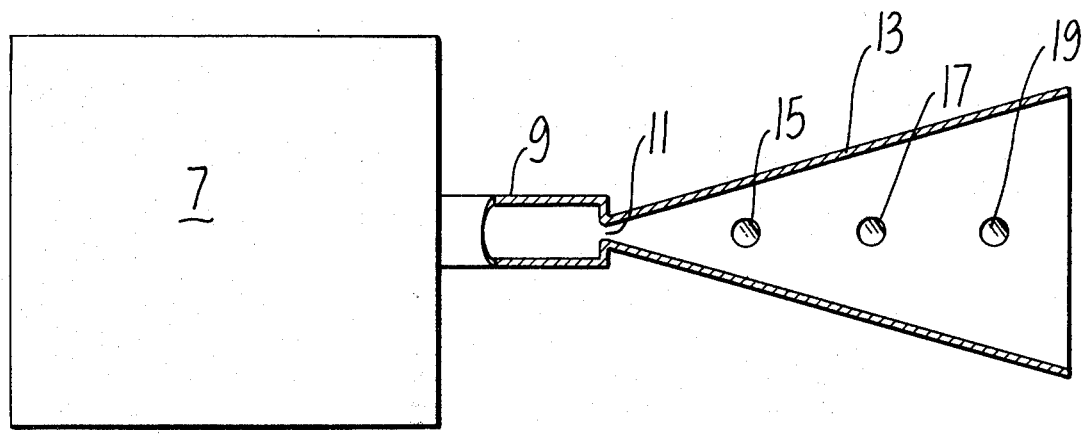
FIG. 1 is a side view, partly in section, of a gasdynamic laser suitable for carrying out the present invention.

In accordance with the present invention a gas mixture is used in a gasdynamic laser, one of which is a diatomic gas such as carbon monoxide. A second gas must be used which has vibrational energy states which are spaced only slightly greater from those of the active gas. Nitrogen has been found very suitable for this purpose. The proportion of the diatomic gas to nitrogen may vary over a wide range such as from 1 to 80 percent by volume of the active gas. In addition, a third gas, which must be an inert monatomic gas such as argon, can be used up to about 90 percent by volume and this enhances the ability of the expansion to lase by reducing the degree of rotational excitation of the active gas. The upper vibrational states of the active diatomic gas become excessively populated in the expansion by the collisional transfer of vibrational energy levels and the way in which it affects the energy transfer. Inversions occur at numerous levels. For example, laser power has been obtained from carbon monoxide transitions at all upper level vibrational quantum numbers between 2 and 11.

The selection of wavelengths may be controlled by introducing wavelength dependent losses in the optical resonator, but in the case of the diatomic gasdynamic lasers of the present invention, they may also be selected by locating the optical axes at different positions along the expansion axes. This latter method utilizes a novel feature of diatomic gasdynamic lasers wherein the wavelength of maximum gain varies with the expansion cross-section area.

In carrying out the present invention, the gas is heated and compressed and allowed to expand through a nozzle at a supersonic rate with an optical path length through the active medium long enough to allow radiative gain to overcome the optical losses. The dimensions of the expansion cross-section area to its minimum cross-section area must be at least 100 times or greater. Preferably the area ratio is substantially greater than this and in one of the examples which follows the area ratio was 2,730.

In carrying out the present invention, the gas must be heated to a temperature of at least 1600°K and may be at 2000°K or even higher. The pressure must be at least 20 atmospheres and preferably is about 100 to 200 atmospheres although even higher pressures can be employed.

The wavelength generated is between 4.7 $\mu$m to 5.4 $\mu$m and the wavelength is a function of the gas mixture and of the location of the optical axes along or perpendicular to the direction of gas expansion. The greater the area ratio, the lower the wavelength. As is later pointed out in detail, a given apparatus may have mirrors placed at different locations along the divergent section so that a number of frequencies may be obtained from a single apparatus.

Various forms of apparatus may be used for generating the high pressure and temperatures necessary such as a helium driven shock tube, a combustion chamber (such as hydrocarbon combustion), a carbon resistance heater, nuclear heater and the like. Although certain specific forms of apparatus are shown, it must be understood that these are for purposes of illustration only and that other forms may be used.

Referring now to the drawings, there is shown in FIG. 1 a hot gas generator 7 which may be of any of the types mentioned above. To this is attached a nozzle reservoir 9 leading to a sonic throat 11 and into an expansion nozzle 13. In this form of apparatus, three different ports are employed, namely at 15, 17 and 19. As was previously mentioned, the area ratio must be at least 100 so that the area of the throat to port 15 must be at least 100 times that of the sonic throat 11 and it will be obvious that the ports at 17 and 19 represent area ratios much greater than this. The nozzle 13 is axi-symmetric and in one practical embodiment of the invention at a half angle of 10° while the sonic throat 11 had an area of 1.27 cm$^2$. The three mirror ports 15, 17 and 19 were located at area ratios of 577, 1,455 and 2,730.

An optically resonant cavity could be provided in any one of the ports by installing two circular mirrors. In a practical embodiment of the invention, each mirror had a 4.4 cm diameter aperture and an inside spherical surface of 10 meters radius. One of the mirrors was germanium coated for 3 percent transmission over the spectral region between 5 and 6 $\mu$m. Transmissivity rose through 14 percent at 4.7 $\mu$m. The other mirror was coated for maximum reflectivity over the same spectral region.

Figure 2:
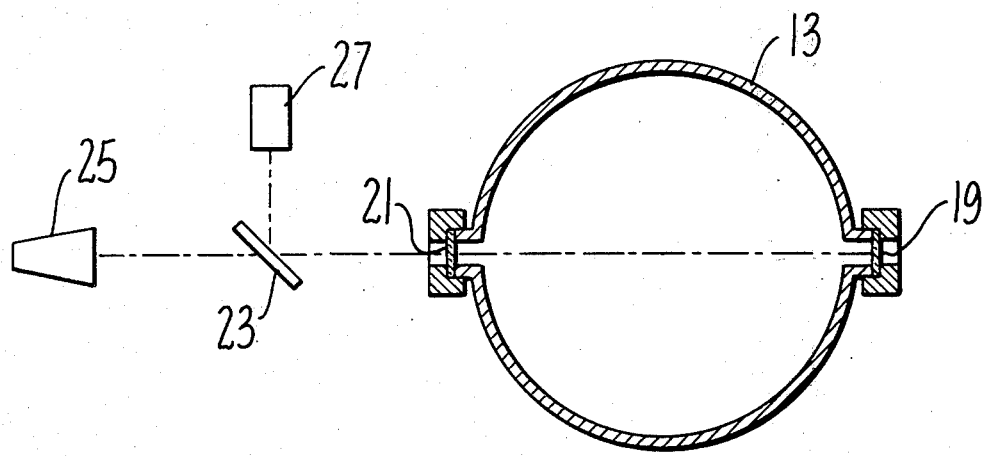
FIG. 2 is a sectional view taken through one of the pairs of the laser of FIG. 1, showing the associated equipment for measuring the power developed by the laser.
Figure 5:
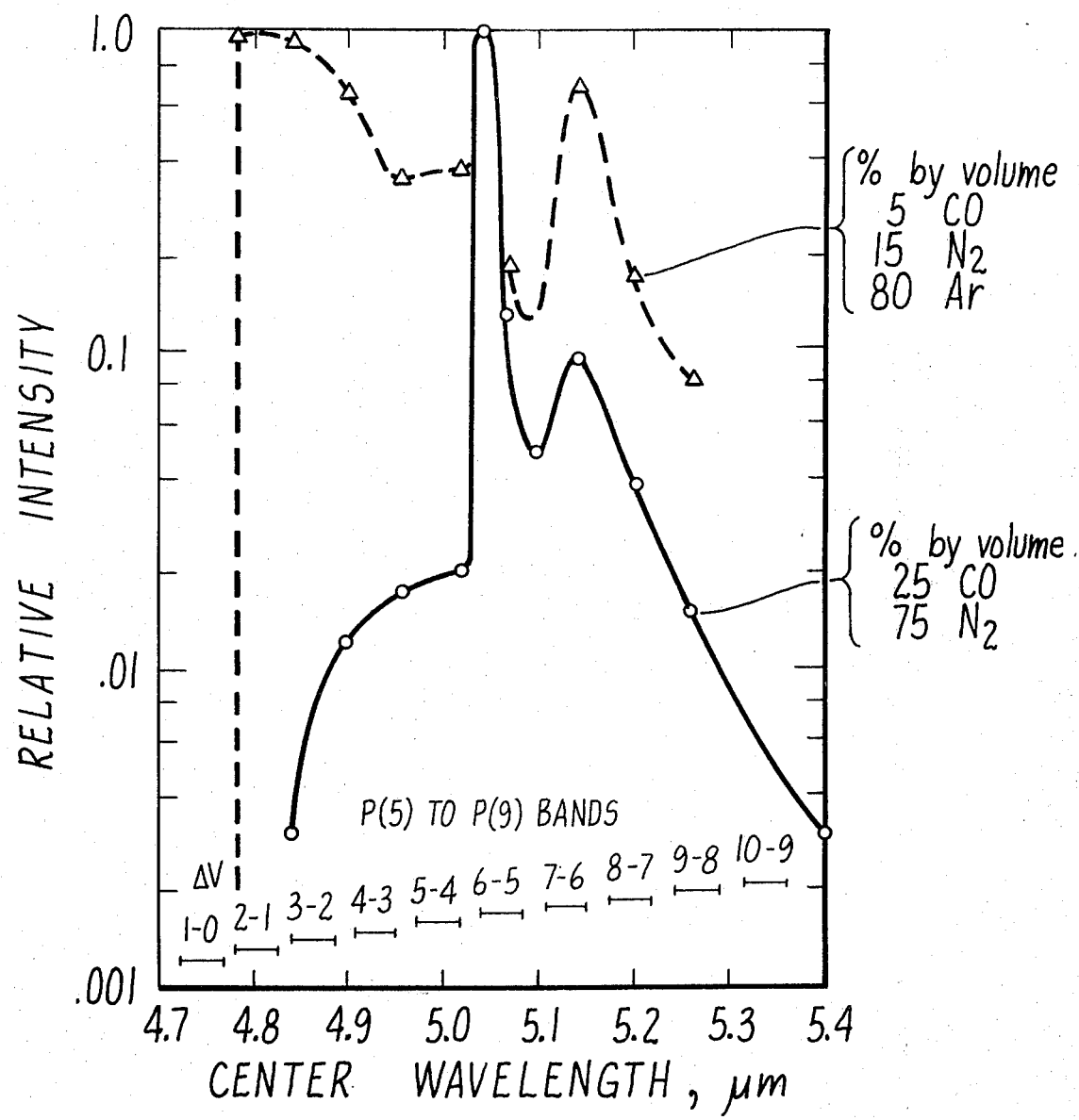
FIG. 5 is a graph showing the relative intensity of the laser action at various wavelengths of two different gas mixtures suitable for use in carrying out the present invention.

In FIG. 2 the method of measuring laser power is shown at the port 19, i.e. at an area ratio of 2,730. As previously stated, the mirror at port 19 was treated for maximum reflectivity over the desired spectral region while the opposite mirror 21 was treated for 3 percent transmission. A calcium fluoride beam splitter 23 was employed which passed 93 percent of the laser power to a calibrated copper slug calorimeter 25. The intensity of the pulse was monitored with a fast response Ge Au detector 27. Thus the combined pulse-shape and energy measurements provided absolute power values to at least 20 percent accuracy at 100 watts of power. The results of several tests are shown in FIG. 5 wherein two different gas mixtures were compared on this apparatus. One gas mixture consisted of 25 percent CO and 75 percent $N_2$ and the results are shown in solid lines while the dash lines show results from a mixture of 5 percent carbon monoxide, 15 percent nitrogen and 80 percent argon. This figure shows the spectral characteristics of such mixtures. The spectral regions for each vibrational transition are indicated in FIG. 5 for the P5 to P9 rotational lines. The CO—$N_2$ mixture lased most intensely near 5.05 $\mu$m, suggesting that the transition of maximum gain would be from the sixth to fifth vibrational levels. The most intense radiation from the 80 percent argon mixture, containing the same relative proportions of carbon monoxide and nitrogen was near 4.78 $\mu$m which would tend to show that the transition of maximum gain to be from the second vibrational level.

Figure 3:
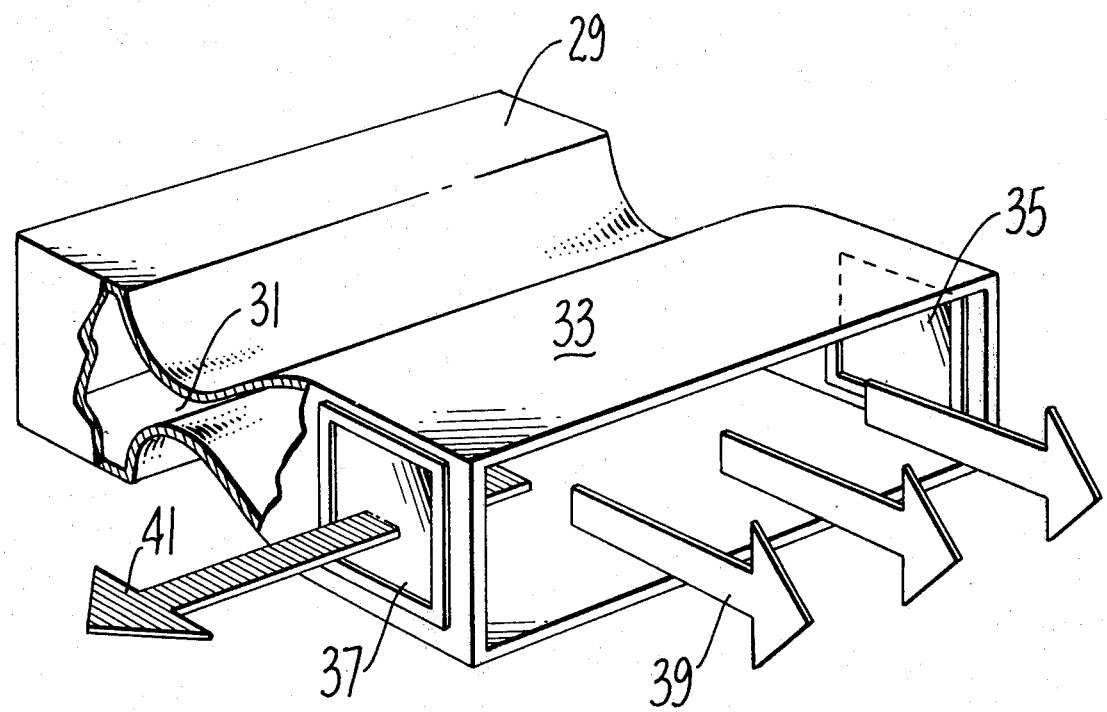
FIG. 3 is a perspective view, partly in section, of a two-dimensional gasdynamic laser suitable for carrying out the present invention.

In FIG. 3 another form of apparatus is shown suitable for carrying out the present invention and in this embodiment instead of being conical, the throat and expansion chamber both have a rectangular cross-section. Thus there is provided a heated reservoir of a high pressure gas 29, a sonic throat area 31 and an expansion chamber 33. The expansion chamber 33 is provided with a fully reflective mirror 35 and a partly reflective mirror 37. As before, the ratio of the area wherein lasing takes place must be at least 100 times the area of the sonic throat. When gas is discharged under the conditions outlined above as at 39, the radiation of infrared energy will take place through the mirror at 37 as indicated by the arrow 41. The advantage of this structure over that shown in FIG. 1 is that the mirrors can view substantially the entire expansion area and thus intercept all of the gas being discharged. In accordance with the embodiment shown in FIGS. 1 and 2 the mirrors view much less of the expansion area so that only a relatively small proportion of the gas is intercepted and contributes to lasing.

Figure 4:
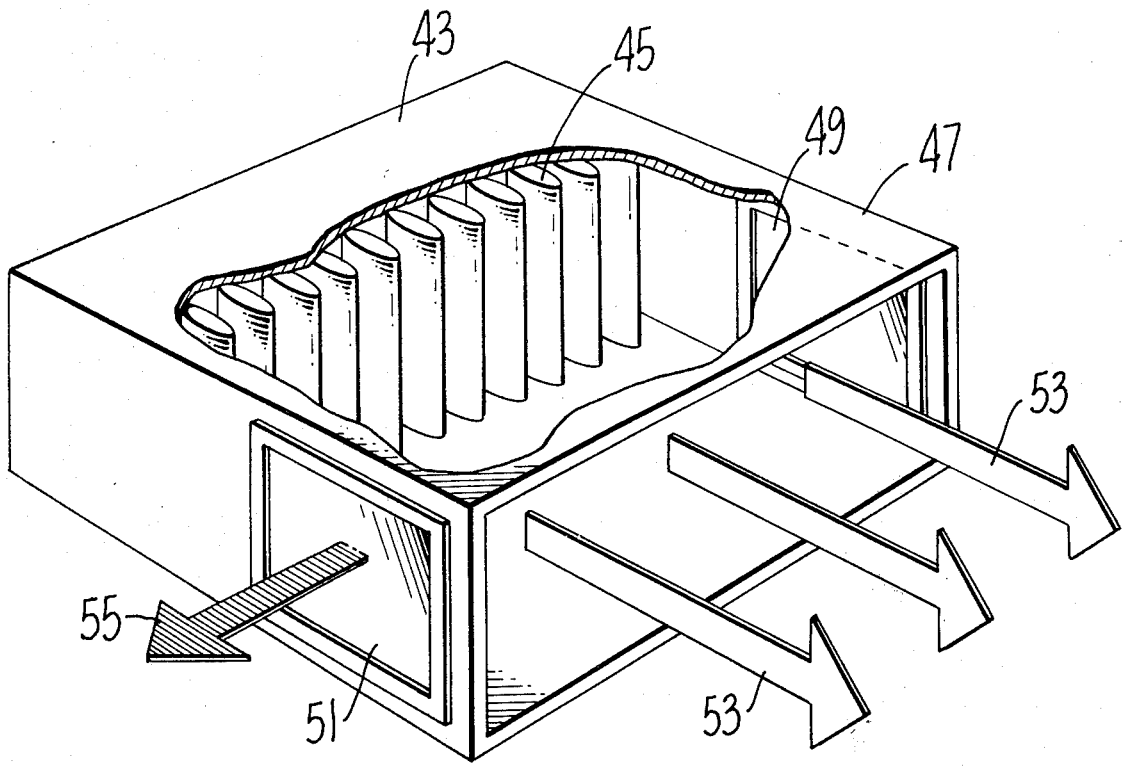
FIG. 4 is a perspective view, partly in section, of a high mass flow gasdynamic laser suitable for carrying out the present invention.

In FIG. 4 another embodiment of the invention is shown and in this embodiment a higher mass flow is achieved by, in effect, providing a large number of parallel nozzles which can service larger mirrors without requiring an increase in the minimum throat dimension. In this embodiment, a chamber 43 is provided for the hot, high pressure gas mixture and a plurality of vane nozzles 45 are interposed between this reservoir and the expansion chamber 47. As before, a fully reflective mirror 49 and a partly reflective mirror 51 are provided so that as gas is discharged as shown by the arrows 53, the radiation takes place as is shown by the arrow 55. Since this provides effectively a large number of nozzles, a large mass flow takes place so that the device is capable of high energy output. However, the area ratio must be the same as previously described so that the cross-sectional area of the expansion chamber 47 must be at least 100 times the total area between the vanes 45 which constitute the plurality of throats.

I claim:

1. In a gasdynamic laser wherein a hot, high pressure gas is discharged through an expansion nozzle and laser action is solely initiated by a thermal expansion of the laser media between mirrors in said nozzle, the improvement comprising utilizing as a gas mixture at least two gases, the first of which is a suitable infrared-active diatomic gas consisting essentially of carbon monoxide and the second of which is a suitable pumping gas consisting essentially of nitrogen, wherein the amount of carbon monoxide ranges from 1 to 80 percent by volume of said gas mixture.

2. The laser of claim 1 wherein a third gas is present in an amount up to about 90 percent of the first and second gases, said third gas being a monatomic gas selected from the noble gases.

3. The laser of claim 2 wherein the noble gas is argon.

4. The laser of claim 1 wherein the gas is heated to a temperature of at least 1,600°K and a pressure of at least 20 atmospheres.

5. The laser of claim 1 wherein the hot compressed gas is expanded through a sonic nozzle into a supersonic divergent section having mirrors therein, wherein the cross-section area ratio between said divergent section and said sonic nozzle is at least 100.

6. The laser of claim 1 wherein the gas is discharged through a two-dimensional slot.

7. The laser of claim 1 wherein the gas is discharged through a plurality of vanes thereby creating a number of sonic throats providing a high mass flow of gas between the laser mirrors.

8. The laser of claim 1 wherein the gas is discharged through a supersonic nozzle, said nozzle having a plurality of mirror pairs perpendicular to the path of gas whereby a plurality of frequencies can be generated in a single apparatus.

* * * * *